United States Patent
Choi et al.

(10) Patent No.: US 12,294,087 B2
(45) Date of Patent: May 6, 2025

(54) NEGATIVE ELECTRODE ACTIVE MATERIAL FOR LITHIUM SECONDARY BATTERY, AND NEGATIVE ELECTRODE FOR LITHIUM SECONDARY BATTERY AND LITHIUM SECONDARY BATTERY INCLUDING THE SAME

(71) Applicant: LG CHEM, LTD., Seoul (KR)

(72) Inventors: Hee Won Choi, Daejeon (KR); Jae Wook Lee, Daejeon (KR); Eun Kyung Kim, Daejeon (KR); Seung Youn Choi, Daejeon (KR); Je Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 612 days.

(21) Appl. No.: 16/960,265

(22) PCT Filed: Feb. 22, 2019

(86) PCT No.: PCT/KR2019/002237
§ 371 (c)(1),
(2) Date: Jul. 6, 2020

(87) PCT Pub. No.: WO2019/164347
PCT Pub. Date: Aug. 29, 2019

(65) Prior Publication Data
US 2021/0075016 A1    Mar. 11, 2021

(30) Foreign Application Priority Data

Feb. 26, 2018   (KR) .................. 10-2018-0023181

(51) Int. Cl.
| | | |
|---|---|---|
| H01M 4/587 | (2010.01) | |
| H01M 4/02 | (2006.01) | |
| H01M 4/133 | (2010.01) | |
| H01M 4/36 | (2006.01) | |
| H01M 10/0525 | (2010.01) | |

(52) U.S. Cl.
CPC .......... *H01M 4/587* (2013.01); *H01M 4/133* (2013.01); *H01M 4/364* (2013.01); *H01M 4/366* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2002/0015888 A1 | 2/2002 | Omaru et al. | |
| 2004/0023115 A1* | 2/2004 | Kato ................... | H01M 50/124 429/217 |
| 2004/0248010 A1 | 12/2004 | Kato et al. | |
| 2011/0281163 A1 | 11/2011 | Kasamatsu et al. | |
| 2012/0037845 A1 | 2/2012 | Yamamoto et al. | |
| 2014/0186702 A1* | 7/2014 | Takahata ............... | H01M 4/364 429/211 |
| 2014/0248528 A1 | 9/2014 | Takahata et al. | |
| 2014/0335428 A1* | 11/2014 | Wakizaka ............. | H01M 4/364 429/337 |
| 2016/0043384 A1 | 2/2016 | Zhamu et al. | |
| 2016/0133922 A1 | 5/2016 | Uhm et al. | |
| 2016/0276657 A1 | 9/2016 | Song et al. | |
| 2016/0322636 A1 | 11/2016 | Lee et al. | |
| 2016/0372751 A1 | 12/2016 | Lee et al. | |
| 2017/0133682 A1 | 5/2017 | Kang et al. | |
| 2017/0317336 A1 | 11/2017 | Zhamu et al. | |
| 2017/0352871 A1* | 12/2017 | Kim .................. | H01M 10/0525 |
| 2017/0373314 A1* | 12/2017 | Takeda ............. | H01M 10/0525 |
| 2018/0175376 A1 | 6/2018 | Chae et al. | |
| 2018/0190985 A1 | 7/2018 | Choi et al. | |
| 2020/0127289 A1 | 4/2020 | Kim et al. | |

FOREIGN PATENT DOCUMENTS

| | | |
|---|---|---|
| CN | 1481041 A | 3/2004 |
| CN | 1702892 A | 11/2005 |
| CN | 1917277 A | 2/2007 |
| CN | 101174683 A | 5/2008 |
| CN | 101916857 A | 12/2010 |
| CN | 102150307 A | 8/2011 |

(Continued)

OTHER PUBLICATIONS

Machine translation of WO2014024473A1 (Year: 2014).*

(Continued)

*Primary Examiner* — Brian R Ohara
*Assistant Examiner* — M. T. Leonard
(74) *Attorney, Agent, or Firm* — Birch, Stewart, Kolasch & Birch, LLP

(57) ABSTRACT

A negative electrode active material for a lithium secondary battery which includes first negative electrode active material particles including artificial graphite particles and a carbon coating layer formed on the artificial graphite particle; and second negative electrode active material particles including natural graphite particles, wherein the first negative electrode active material particles have a larger average particle diameter ($D_{50}$) than an average particle diameter ($D_{50}$) of the second negative electrode active material particles, and a weight ratio of the first negative electrode active material particles and the second negative electrode active material particles is in a range of 70:30 to 95:5.

10 Claims, No Drawings

(56) References Cited

FOREIGN PATENT DOCUMENTS

| | | | | | |
|---|---|---|---|---|---|
| CN | 102292852 | A | 12/2011 | | |
| CN | 102659091 | A | 9/2012 | | |
| CN | 203967180 | U | 11/2014 | | |
| CN | 104521038 | A | 4/2015 | | |
| CN | 104609400 | A | 5/2015 | | |
| CN | 104716383 | A | 6/2015 | | |
| CN | 104838526 | A * | 8/2015 | ............ | H01M 4/133 |
| CN | 105144436 | A | 12/2015 | | |
| CN | 105794027 | A | 7/2016 | | |
| CN | 105917501 | A | 8/2016 | | |
| CN | 108532051 | A | 3/2017 | | |
| CN | 104201343 | A | 2/2025 | | |
| JP | 7-134988 | A | 5/1995 | | |
| JP | 10-247495 | A | 9/1998 | | |
| JP | 2000-156226 | A | 6/2000 | | |
| JP | 2001-57230 | A | 2/2001 | | |
| JP | 3440638 | B2 | 8/2003 | | |
| JP | 4403327 | B2 | 1/2010 | | |
| JP | WO 2012/127548 | A1 * | 9/2012 | ............ | H01M 4/133 |
| JP | 2013-506233 | A | 2/2013 | | |
| JP | 2013-211254 | A | 10/2013 | | |
| JP | 2016-106376 | A | 6/2016 | | |
| JP | 2016-213130 | A | 2/2025 | | |
| KR | 10-0326446 | B1 | 2/2002 | | |
| KR | 10-2008-0029480 | A | 4/2008 | | |
| KR | 10-2014-0099988 | * | 8/2014 | .......... | H01M 10/052 |
| KR | 10-2016-0149762 | A | 12/2016 | | |
| KR | 10-2017-0007140 | A | 1/2017 | | |
| KR | 10-2017-0053123 | A | 5/2017 | | |
| KR | 10-2017-0055429 | A | 5/2017 | | |
| KR | 10-2017-0075661 | A | 7/2017 | | |
| KR | 10-2017-0093754 | A | 8/2017 | | |
| WO | WO 2012/127548 | A1 | 9/2012 | | |
| WO | WO 2013/128829 | A1 | 9/2013 | | |
| WO | WO-2014024473 | A1 * | 2/2014 | ........ | H01M 10/0525 |
| WO | WO 2017/082680 | A1 | 5/2017 | | |

OTHER PUBLICATIONS

Machine translation of CN104838526A (Year: 2015).*
International Search Report (PCT/ISA/210) issued in PCT/KR2019/002237, dated May 28, 2019.
Extended European Search Report for European Application No. 19757524.4, dated Dec. 2, 2020.
Wanci et al., "An Investigation on Natural Graphite Used as an Anode Materials for Lithium-ion Batteries," Tsinghua University, 2008, pp. 376-381.

* cited by examiner

NEGATIVE ELECTRODE ACTIVE MATERIAL FOR LITHIUM SECONDARY BATTERY, AND NEGATIVE ELECTRODE FOR LITHIUM SECONDARY BATTERY AND LITHIUM SECONDARY BATTERY INCLUDING THE SAME

TECHNICAL FIELD

Cross-Reference to Related Application

This application claims priority to and the benefit of Korean Patent Application No. 10-2018-0023181, filed on Feb. 26, 2018, the disclosure of which is incorporated herein by reference in its entirety.

TECHNICAL FIELD

The present invention relates to a negative electrode active material for a lithium secondary battery, and a negative electrode for a lithium secondary battery and a lithium secondary battery including the same.

BACKGROUND ART

As the price of energy sources increases because of the depletion of fossil fuels and concerns about environmental pollution are amplified, environmentally-friendly alternative energy sources have become indispensable factors for future life.

In particular, due to technology development and increasing demand for mobile devices, demand for secondary batteries as environmentally-friendly alternative energy sources is rapidly increasing.

As a negative electrode of the secondary battery, lithium metal has been conventionally used. However, as concerns have been raised about a short circuit in a battery caused by formation of a dendrite and a risk of explosion caused thereby, the use of a carbon-based active material capable of reversible intercalation and deintercalation of lithium ions and maintaining structural and electrical properties has emerged.

As the carbon-based active material, various types of carbon-based materials such as artificial graphite, natural graphite, hard carbon, etc. have been used, and, in particular, a graphite-based active material capable of ensuring the lifetime characteristic of a lithium secondary battery due to its excellent reversibility has been most widely used. Since the graphite-based active material has a lower discharge voltage of −0.2 V with respect to lithium, a battery using the graphite-based active material may exhibit a high discharge voltage of 3.6 V, thereby providing many advantages in the aspect of energy density of a lithium battery.

Meanwhile, in order to fabricate a lithium secondary battery with high capacity and high electrode density, a rolling process is performed in the manufacture of an electrode of the lithium secondary battery. In this case, when the graphite-based active material is hard, the active material is not easily rolled, and it may be difficult to obtain desired density. On the other hand, when the graphite-based active material is soft, the active material is easily rolled in the manufacture of an electrode, and thus a high-density electrode is easily obtained, but pores present between particles are completely blocked, which may have adverse effects on impregnation with an electrolyte.

Japanese Registered Patent No. 4403327 discloses graphite powder for a negative electrode for a lithium ion secondary battery. However, it did not present an alternative solution to the above-described problem.

PRIOR-ART DOCUMENTS

Patent Documents

Japanese Registered Patent No. 4403327

DISCLOSURE

Technical Problem

An objective of the present invention is to provide a negative electrode active material for a lithium secondary battery which has enhanced high-temperature storage performance and capacity efficiency and also exhibits an enhanced quick charging characteristic.

In addition, another objective of the present invention is to provide a negative electrode for a lithium secondary battery and a lithium secondary battery which include the above-described negative electrode active material for a lithium secondary battery.

Technical Solution

According to an embodiment of the present invention, there is provided a negative electrode active material for a lithium secondary battery which includes first negative electrode active material particles including artificial graphite particles and a carbon coating layer formed on the artificial graphite particle; and second negative electrode active material particles including natural graphite particles, wherein the first negative electrode active material particles have a larger average particle diameter ($D_{50}$) than an average particle diameter ($D_{50}$) of the second negative electrode active material particles, and the first negative electrode active material particles and the second negative electrode active material particles are included in a weight ratio of 70:30 to 95:5.

In addition, according to another embodiment of the present invention, there is provided a negative electrode for a lithium secondary battery which includes the above-described negative electrode active material for a lithium secondary battery.

Additionally, according to still another embodiment of the present invention, there is provided a lithium secondary battery including the above-described negative electrode for a lithium secondary battery.

Advantageous Effects

A negative electrode active material for a lithium secondary battery according to the present invention includes, in an appropriate ratio, first negative electrode active material particles which include a carbon coating layer so as to exhibit a high level of hardness and second negative electrode active material particles which do not include a carbon coating layer and exhibit a low level of hardness, and the first negative electrode active material particles have a larger particle diameter than that of the second negative electrode active material particles. Therefore, the second negative electrode active material particles can be arranged so as to surround the first negative electrode active material particles having a larger particle diameter, so that the active material suffers minor damage when rolled, thereby a high electrode density can be realized. Also, the rolling of the active material causes a minor change to the specific surface area of the active material layer, so that high-temperature storage performance can be enhanced. Also, since the first negative electrode active material particles include artificial graphite particles, a quick charging characteristic of the battery can be improved. Furthermore, since the usage amount of the second negative electrode active material particles including natural graphite particles is appropriate with respect to the usage amount of the first negative electrode active material particles, capacity can be improved while maintaining a quick charging characteristic.

Accordingly, a negative electrode for a lithium secondary battery and a lithium secondary battery which include the above-described negative electrode active material for a lithium secondary battery can be excellent in a quick charging characteristic, capacity efficiency, and high-temperature storage performance.

Mode for Invention

Hereinafter, the present invention will be described in more detail to promote understanding of the present invention. Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

In the specification, porosity can be defined as follows:

Porosity=Pore volume per unit mass/(Specific volume+Pore volume per unit mass)

The measurement of the porosity is not particularly limited. According to an embodiment of the present invention, the porosity may be measured, for example, by a Brunauer-Emmett-Teller (BET) method with BELSORP (BET instrument) commercially available from BEL Japan, Inc. using a gaseous adsorbate such as nitrogen or the like or by mercury (Hg) porosimetry.

In the specification, an average particle diameter ($D_{50}$) can be defined as a particle diameter corresponding to $50^{th}$ percentile in the cumulative volume-based particle size distribution curve. The average particle diameter may be measured, for example, by using a laser diffraction method. The laser diffraction method generally enables measurement of a particle diameter ranging from submicrons to several mm, and may obtain a result with high reproducibility and high resolvability.

Specifically, the present invention provides a negative electrode active material for a lithium secondary battery with structural bimodality in which two types of negative electrode active material particles having mutually different particle diameters are mixed to enhance the high-temperature storage performance and capacity efficiency of an electrode, and a negative electrode for a lithium secondary battery including the same.

In addition, the present invention provides a lithium secondary battery including the negative electrode for a lithium secondary battery.

Negative Electrode Active Material for Lithium Secondary Battery

The present invention relates to a negative electrode active material for a lithium secondary battery. Specifically, the negative electrode active material for a lithium secondary battery includes (A) first negative electrode active material particles including artificial graphite particles and a carbon coating layer formed on the artificial graphite particle; and (B) second negative electrode active material particles including natural graphite particles, wherein the first negative electrode active material particles have a larger average particle diameter ($D_{50}$) than an average particle diameter ($D_{50}$) of the second negative electrode active material particles, and the first negative electrode active material particles and the second negative electrode active material particles are included in a weight ratio of 70:30 to 95:5.

(A) First Negative Electrode Active Material Particle

The first negative electrode active material particle includes an artificial graphite particle and a carbon coating layer formed on the artificial graphite particle.

The artificial graphite particle may serve to enhance a quick charging characteristic of a battery. If the first negative electrode active material particle were to include a natural graphite particle instead of the artificial graphite particle, it would yield the problem of significantly degraded high-temperature storage characteristic in the fabricated battery because, considering the size and content of the first negative electrode active material particle, the content of a natural graphite particle would be excessively high.

The artificial graphite particle may be a secondary artificial graphite particle wherein the secondary artificial graphite particle includes one or more primary artificial graphite particles agglomerated together.

When the artificial graphite particle is a secondary artificial graphite particle composed of an agglomerate of primary artificial graphite particles, a first pore may exist inside the secondary artificial graphite particle.

The first pore may be an empty space between the primary artificial graphite particles and may be amorphous. There may be two or more first pores. The first pore may be present in various ways: it may be extended to the surface of the secondary artificial graphite particle so as to be exposed to the outside, or it may exist only inside the secondary artificial graphite particle. Since the first pore may allow a contact area between a negative electrode active material and a lithium ion to be further widened, capacity and cycle lifetime characteristic may be further improved.

When the artificial graphite particle is a secondary artificial graphite particle formed by agglomerating one or more primary artificial graphite particles, the secondary artificial graphite particle may be formed by agglomerating primary artificial graphite particles due to the centrifugal force generated when primary artificial graphite particles are put into a reactor and then the reactor is operated, that is, the primary artificial graphite particles are spun. In the agglomerating process of primary artificial graphite particles, in addition to the primary artificial graphite particles, pitch, a resin binder, etc. may also be put into a reactor and thermally treated at about 1,400° C. to 1,600° C. After the secondary artificial graphite particle formed by agglomerating primary artificial graphite particles is obtained, the secondary artificial graphite particle may be further subjected to a thermal treatment process. Since the thermal treatment process allows primary artificial graphite particles to be combined or rearranged, the microstructure of the secondary artificial graphite particle may be improved.

In addition, the artificial graphite particle prepared by the method as described above may have a porosity of about 10% to 30%, specifically, 15% to 25%. When the porosity of the artificial graphite particle falls within the above range of about 10% to 30%, a negative electrode active material may attain a desired level of total porosity to be described below.

The artificial graphite particle may have a (BET) specific surface area of 0.5 m$^2$/g to 1.5 m$^2$/g. The artificial graphite particle having a (BET) specific surface area within the above range may have an excellent quick charging characteristic and an excellent cycle lifetime characteristic.

The specific surface area of the artificial graphite particle may be measured through a Brunauer-Emmett-Teller (BET) method. For example, the specific surface area may be measured through a 6-point BET method in accordance with a nitrogen gas adsorption flow assay using a porosimetry analyzer (Belsorp-II mini commercially available from Bell Japan Inc.).

The carbon coating layer may have effects of facilitating the entry and exit of lithium ions into the artificial graphite particle and lowering charge transfer resistance of lithium ions. In addition, since the carbon coating layer is formed on the artificial graphite particle, hardness may be enhanced compared with other carbon-based particles such as natural graphite, etc. Accordingly, the structural stability of the active material may be enhanced, and the quick charging performance of a battery may be further enhanced. In addition, when the artificial graphite particle is in the form of the secondary artificial graphite particle, the structure of secondary particle may be destroyed upon charging and discharging, but the carbon coating layer may allow the morphology of secondary artificial graphite particle to be favorably maintained, thereby the quick charging performance may be maintained.

The carbon coating layer may be included in an amount of 3.5 parts by weight to 8 parts by weight, preferably, 4 parts by weight to 6 parts by weight with respect to 100 parts by weight of the first negative electrode active material particle. A case where the content of the carbon coating layer falls within the above range of an amount of 3.5 parts by weight to 8 parts by weight is preferred in the aspect of reducing charge transfer resistance of lithium ions and enhancing rolling performance.

The first negative electrode active material particle including the carbon coating layer formed therein as described above may include a pore which is an empty space between the carbon coating layer and the artificial graphite particle or on the surface thereof. In this case, the entire first negative electrode active material particles including the carbon coating layer formed therein preferably have a porosity of about 10% to 30%, for example, about 12% to 18%. This is because, when the porosity of first negative electrode active material particles falls within the above range of about 10% to 30%, a negative electrode active material may attain a desired level of total porosity to be described below.

The carbon coating layer may be formed by providing one or more materials selected from the group consisting of coal-tar pitch, rayon, and polyacrylonitrile-based resins or a precursor thereof on the surface of artificial graphite particle and then thermally decomposing the same. Preferably, the carbon coating layer includes soft carbon and may be formed by the calcination and thermal decomposition of the coal-tar pitch. The thermal treatment process for forming the carbon coating layer may be carried out at a temperature ranging from 1,000° C. to 4,000° C. In this case, when the thermal treatment process is carried out at less than 1,000° C., it may be difficult to uniformly form the carbon coating layer, and when the thermal treatment process is carried out at greater than 4,000° C., the carbon coating layer may be excessively formed during the process.

The first negative electrode active material particles may have an average particle diameter ($D_{50}$) of 15 μm to 25 μm. A case where the average particle diameter of the first negative electrode active material particles falls within the above range is preferred in the aspect of realizing a battery excellent in a quick charging characteristic and high-temperature storage performance. Also, the first negative electrode active material particles preferably have an average particle diameter ($D_{50}$) of 17 μm to 23 μm, more preferably, 19 μm to 21 μm in the aspect of further enhancing the above-described quick charging characteristic and high-temperature storage performance.

In addition, the first negative electrode active material particles may have a (BET) specific surface area of 0.5 m$^2$/g to 3 m$^2$/g, preferably, 0.8 m$^2$/g to 1.2 m$^2$/g. Accordingly, the negative electrode active material for a lithium secondary battery according to the present invention including the first negative electrode active material particles may be excellent in a capacity characteristic and a quick charging characteristic.

The first negative electrode active material particles may have a spherical shape, which is preferred in the aspect of enhancing rolling performance, a capacity characteristic, and a quick charging characteristic.

In the first negative electrode active material particle, a second pore which is an empty space present between the artificial graphite particle and the carbon coating layer may exist. For example, when the first negative electrode active material particle is a secondary artificial graphite particle formed by agglomerating the primary artificial graphite particles, a second pore which is an empty space present between the secondary artificial graphite particle and the carbon coating layer may exist. In this case, there may be two or more second pores. The second pore may be present in various ways: it may be extended to the surface of the first negative electrode active material particle so as to be exposed to the outside, or it may exist only inside the first negative electrode active material particle.

(B) Second Negative Electrode Active Material Particle

The second negative electrode active material particle includes a natural graphite particle. Specifically, the second negative electrode active material particle does not include a carbon coating layer and may be composed of only a natural graphite particle. The natural graphite particle may serve to improve battery capacity due to its higher energy density compared to other carbon-based materials such as artificial graphite particles, etc.

In the second negative electrode active material particle, a carbon coating layer is not formed on the surface of a natural graphite particle. Accordingly, since the second negative electrode active material particle is relatively soft compared to the first negative electrode active material particle including a carbon coating layer formed therein, by the blending of the first and second negative electrode active material particles, a change in a specific surface area of an electrode during a rolling process may be minimized, and high-temperature storage performance may be enhanced.

An average particle diameter ($D_{50}$) of the second negative electrode active material particles may be smaller than that of the first negative electrode active material particles, and specifically, may be 6 μm to 12 μm, more specifically, 8 μm to 11 μm, and even more specifically, 9 μm to 10 μm. Since the second negative electrode active material particles have a relatively small average particle diameter and are soft compared to the first negative electrode active material particles, when the first and second negative electrode active material particles are blended, the second negative electrode active material particles may be disposed favorably between the first negative electrode active material particles and on the surface of the first negative electrode active material particles. Accordingly, a change in a specific surface area of a negative electrode mixture layer during a rolling process may be reduced, and thus high-temperature storage performance and a high-temperature cycle characteristic may be enhanced.

The second negative electrode active material particle may be a single particle composed of natural graphite. Accordingly, the second negative electrode active material particle in the form of a single particle may have a smoother surface than that in the form of a secondary particle. Therefore, when blended with the first negative electrode active material particles, the second negative electrode active material particles may effectively surround the first negative electrode active material particles, and accordingly, rolling performance and high-temperature storage performance may be enhanced.

The second negative electrode active material particle may have a spherical shape, which is preferred in the aspect of enhancing rolling performance and a high-temperature storage characteristic when the second negative electrode active material particles are blended with the first negative electrode active material particles.

The second negative electrode active material particle may have a porosity of 10% to 30%, for example, about 18% to 27%. When the porosity of the second negative electrode active material particle falls within the above range of about 10% to 30%, a negative electrode active material may attain a desired level of total porosity to be described below.

The second negative electrode active material particle may have a (BET) specific surface area of 0.5 $m^2/g$ to 5 $m^2/g$, preferably, 1.5 $m^2/g$ to 2.5 $m^2/g$. A case where the specific surface area of the second negative electrode active material particle falls within the above range of 0.5 $m^2/g$ to 5 $m^2/g$ is preferred in the aspect of enhancing rolling performance during a rolling process and minimizing a change in a structure of the electrode.

The negative electrode active material for a lithium secondary battery according to the present invention may include (A) the above-described first negative electrode active material particles and (B) the above-described second negative electrode active material particles in a weight ratio of 70:30 to 95:5.

The first negative electrode active material particles and the second negative electrode active material particles may be included in the negative electrode active material for a lithium secondary battery in a weight ratio of 70:30 to 95:5, preferably 75:25 to 90:10, and more preferably 80:20 to 85:15.

Since the negative electrode active material for a lithium secondary battery according to the present invention includes the first and second negative electrode active material particles in the above-described weight ratio, a change in a specific surface area of the active material during a rolling process is minimized, and accordingly, high-temperature storage performance may be further enhanced.

When the first negative electrode active material particles are included in an amount of less than 70 wt % and the second negative electrode active material particles are included in an amount of greater than 30 wt %, an effect of enhancing a quick charging characteristic resulting from the first negative electrode active material particle may be negligible, discharge capacity may be degraded due to irreversibility, and initial efficiency may be degraded. When the first negative electrode active material particles are included in an amount of greater than 95 wt % and the second negative electrode active material particles are included in an amount of less than 5 wt %, capacity efficiency may be degraded. Also, since the second negative electrode active material particles cannot effectively surround the first negative electrode active material particles, a specific surface area is significantly changed during a rolling process, and high-temperature storage performance and a cycle characteristic may be deteriorated.

In addition, an average particle diameter ($D_{50}$) of the first negative electrode active material particles is larger than that of the second negative electrode active material particles. Since the first negative electrode active material particles include an artificial graphite particle and are included with a larger particle diameter than that of the second negative electrode active material, an excellent high-temperature storage characteristic may be exhibited. Furthermore, since the second negative electrode active material particles with a relatively small particle diameter may be disposed to surround the first negative electrode active material particles with a relatively large particle diameter, high-temperature storage performance when the active material is rolled may be further improved as described above.

In addition, in the negative electrode active material for a lithium secondary battery according to the present invention, a third pore may exist due to the size of the first negative electrode active material particle and the second negative electrode active material particle.

Additionally, the negative electrode active material for a lithium secondary battery according to the present invention may have a total porosity of about 10% to 30%, preferably, about 13% to 22%. When the total porosity of the negative electrode active material falls within the above range, in particular, a quick charging characteristic is excellently exhibited.

Meanwhile, the total porosity of the negative electrode active material may be appropriately adjusted by controlling a porosity of the first negative electrode active material particle, a porosity of the second negative electrode active material particle, and a content ratio of the first negative electrode active material particles and the second negative electrode active material particles.

The negative electrode active material for a lithium secondary battery may have a (BET) specific surface area of 0.5 $m^2/g$ to 5 $m^2/g$, preferably, 1.2 $m^2/g$ to 3 $m^2/g$. When the specific surface area of the negative electrode active material falls within the above range, the volume expansion during charging and discharging with lithium may be effectively accommodated, and a side reaction with an electrolyte may be effectively controlled.

Negative Electrode for Lithium Secondary Battery

In addition, the present invention provides a negative electrode for a lithium secondary battery which includes the above-described negative electrode active material for a lithium secondary battery.

Specifically, the negative electrode for a lithium secondary battery according to the present invention includes a negative electrode current collector; and a negative electrode mixture layer formed on the negative electrode current collector, wherein the negative electrode mixture layer includes the above-described negative electrode active material for a lithium secondary battery.

The negative electrode current collector is generally prepared with a thickness of 3 to 500 μm. Such a negative electrode current collector is not particularly limited as long as it does not cause a chemical change in the battery and has high conductivity. For example, the negative electrode current collector may be copper, stainless steel, aluminum, nickel, titanium, calcined carbon, or copper or stainless steel whose surface is treated with carbon, nickel, titanium, silver, or the like, an aluminum-cadmium alloy, or the like. In addition, the negative electrode current collector, like a positive electrode current collector, may have fine irregularities at a surface thereof to increase adhesion with the negative electrode active material. The negative electrode current collector may be used in any of various forms such as a film, a sheet, a foil, a net, a porous material, a foam, a non-woven fabric, and the like.

The negative electrode mixture layer includes the above-described negative electrode active material for a lithium secondary battery.

Descriptions of the first negative electrode active material particles and the second negative electrode active material particles included in the negative electrode active material for a lithium secondary battery according to the present invention are the same as described above.

The negative electrode mixture layer may further include, in addition to the above-described negative electrode active material for a lithium secondary battery, other active materials known in the art, specifically, one or two or more negative electrode active materials selected from the group consisting of a carbonaceous material; a lithium-containing titanium composite oxide (LTO), a metal such as Si, Sn, Li, Zn, Mg, Cd, Ce, Ni, or Fe; an alloy composed of the metal; an oxide of the metal; and a composite of the metal and carbon in a range which does not hinder the effects of the present invention.

The negative electrode active material may be included in an amount of 80 wt % to 99 wt % with respect to the total weight of the negative electrode mixture.

In addition, the negative electrode mixture layer according to the present invention may optionally further include at least one additive selected from the group consisting of a binder, a thickener, and a conductive material.

The binder is a component that assists bonding between a conductive material, an active material, and a current collector, and is generally added in an amount of 1 to 30 wt % with respect to the total weight of the negative electrode mixture. Specific examples of the binder include polyvinylidene fluoride (PVDF), polyvinyl alcohol, carboxymethyl cellulose (CMC), starches, hydroxypropyl cellulose, regenerated cellulose, polyvinyl pyrrolidone, polytetrafluoroethylene, polyethylene, polypropylene, an ethylene-propylene-diene polymer (EPDM), a sulfonated EPDM, styrene-butadiene rubber (SBR), fluororubber, various copolymers thereof, etc.

The thickener may be any thickener conventionally used to fabricate a lithium secondary battery, and specific examples of the thickener include carboxymethyl cellulose (CMC), etc.

The conductive material is a component for further enhancing the conductivity of the negative electrode active material, and may be added in an amount of 1 to 20 wt % with respect to the total weight of the negative electrode mixture. Such a conductive material is not particularly limited as long as it does not cause a chemical change in the battery and has conductivity. Specific examples of the conductive material include graphite such as natural graphite, artificial graphite, etc.; carbon black such as acetylene black, Ketjen black, channel black, furnace black, lamp black, thermal black, etc.; a conductive fiber such as carbon fiber, metallic fiber, etc.; metallic powder such as carbon fluoride powder, aluminum powder, nickel powder, etc.; a conductive whisker made of zinc oxide, potassium titanate, etc.; a conductive metal oxide such as titanium oxide, etc.; and a conductive material such as a polyphenylene derivative, etc. Specific examples of a commercially available conductive material include the acetylene black series (commercially available from Chevron Chemical Company, Denka Singapore Private Limited (Denka black) or Gulf Oil Company), Ketjen black, the EC series (commercially available from Armak Company), Vulcan XC-72 (commercially available from Cabot Company), Super P (commercially available from Timcal), etc.

The solvent may be water or an organic solvent such as N-methyl-2-pyrrolidone (NMP), etc. and may be used in an amount in which preferable viscosity is exhibited when the negative electrode active material and optionally a binder, a conductive material, etc. are included. For example, the solvent may be included in such a way that the concentration of solid contents including a negative electrode active material and optionally a binder and a conductive material is 50 wt % to 95 wt %, preferably, 70 to 90 wt %.

Lithium Secondary Battery

In addition, the present invention provides a lithium secondary battery including the above-described negative electrode for a lithium secondary battery.

The lithium secondary battery may include the above-described negative electrode for a lithium secondary battery, a positive electrode, a separator interposed between the negative electrode and the positive electrode, and an electrolyte.

Specifically, the lithium secondary battery according to the present invention may be fabricated by injecting a non-aqueous electrolyte into an electrode structure composed of a positive electrode, a negative electrode, and a separator interposed between the positive electrode and the negative electrode. In this case, the positive electrode, the negative electrode, and the separator, which constitute the electrode structure, may be of any type commonly used to fabricate a lithium secondary battery.

In this case, the positive electrode may be manufactured by applying, on a positive electrode current collector, a positive electrode active material slurry including a positive electrode active material and optionally a binder, a conductive material, a solvent, etc., followed by drying and rolling.

The positive electrode current collector is not particularly limited as long as it does not cause a chemical change in the battery and has conductivity. For example, the positive electrode current collector may be stainless steel, aluminum, nickel, titanium, calcined carbon, or aluminum or stainless steel whose surface is treated with carbon, nickel, titanium, silver, or the like.

The positive electrode active material may be a compound capable of reversible intercalation and deintercalation of lithium ions, and, specifically, may include a lithium composite metal oxide containing lithium and one or more metals such as cobalt, manganese, nickel, or aluminum. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (here, $0<Y<1$), $LiMn_{2-Z}Ni_ZO_4$ (here, $0<Z<2$), etc.), a lithium-nickel-cobalt-based oxide (e.g., $LiNi_{1-Y1}Co_{Y1}O_2$ (here, $0<Y1<1$), etc.), a lithium-manganese-cobalt-based oxide (e.g., $LiCo_{1-Y2}Mn_{Y1}O_2$ (here, $0<Y2<1$), $LiMn_{2-Z1}Co_{Z1}O_4$ (here, $0<Z1<2$), etc.), a lithium-nickel-manganese-cobalt-based oxide (e.g., $Li(Ni_pCo_qMn_{r1})O_2$ (here, $0<p<1$, $0<q<1$, $0<r1<1$, and $p+q+r1=1$), $Li(Ni_{p1}Co_{q1}Mn_{r2})O_4$ (here, $0<p1<2$, $0<q1<2$, $0<r2<2$, and $p1+q1+r2=2$), etc.), or a lithium-nickel-cobalt-transition metal (M) oxide (e.g., $Li(Ni_{p2}Co_{q2}Mn_{r3}M_{S2})O_2$ (here, M is selected from the group consisting of Al, Fe, V, Cr, Ti, Ta, Mg and Mo, and p2, q2, r3 and s2 represent an atomic fraction of each independent element, and satisfy $0<p2<1$, $0<q2<1$, $0<r3<1$, $0<s2<1$, and $p2+q2+r3+s2=1$), etc.), and these compounds may be used alone or in combination of two or more thereof. In particular, in that the capacity characteristic and stability of a battery may be increased, the lithium composite metal oxide may be $LiCoO_2$, $LiMnO_2$, $LiNiO_2$, a lithium-nickel-manganese-cobalt-based oxide (e.g., $Li(Ni_{0.6}Mn_{0.2}Co_{0.2})O_2$, $Li(Ni_{0.5}Mn_{0.3}Co_{0.2})O_2$, $Li(Ni_{0.8}Mn_{0.1}Co_{0.1})O_2$, etc.) or a lithium-nickel-cobalt-aluminum-based oxide (e.g., $Li(Ni_{0.8}Co_{0.15}Al_{0.05})O_2$, etc.). Considering that the adjustment of the types and content ratio of constituent elements forming the lithium composite metal oxide has the remarkable improvement effect, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, etc., and these compounds may be used alone or in combination of two or more thereof.

The positive electrode active material may be included in an amount of 80 wt % to 99 wt % with respect to the total weight of the positive electrode mixture.

The binder is a component that assists binding between an active material and a conductive material, etc. and binding to a current collector, and is commonly added in an amount of 1 to 30 wt % with respect to the total weight of the positive electrode mixture. Examples of the binder include polyvinylidene fluoride, polyvinyl alcohol, carboxymethyl cellulose (CMC), starches, hydroxypropyl cellulose, regenerated cellulose, polyvinyl pyrrolidone, polytetrafluoroethylene, polyethylene, polypropylene, an ethylene-propylene-diene terpolymer (EPDM), a sulfonated EPDM, styrene-butadiene rubber, fluororubber, various copolymers thereof, etc.

The conductive material is commonly added in an amount of 1 to 30 wt % with respect to the total weight of the positive electrode mixture.

Such a conductive material is not particularly limited as long as it does not cause a chemical change in the battery and has conductivity. Examples of the conductive material include graphite; a carbonaceous material such as carbon black, acetylene black, Ketjen black, channel black, furnace black, lamp black, thermal black, etc.; a conductive fiber such as carbon fiber, metallic fiber, etc.; metallic powder such as carbon fluoride powder, aluminum powder, nickel powder, etc.; a conductive whisker made of zinc oxide, potassium titanate, etc.; a conductive metal oxide such as titanium oxide, etc.; and a conductive material such as a polyphenylene derivative, etc. Specific examples of a commercially available conductive material include the acetylene black series (commercially available from Chevron Chemical Company, Denka Singapore Private Limited (Denka black) or Gulf Oil Company), Ketjen black, the EC series (commercially available from Armak Company), Vulcan XC-72 (commercially available from Cabot Company), Super P (commercially available from Timcal), etc.

The solvent may be an organic solvent such as NMP, etc., and may be used in an amount in which preferable viscosity is exhibited when the positive electrode active material and optionally a binder, a conductive material, etc. are included. For example, the solvent may be included in such a way that the concentration of solid contents including a positive electrode active material and optionally a binder and a conductive material is 50 wt % to 95 wt %, preferably, 70 to 90 wt %.

In the lithium secondary battery, the separator serves to separate the negative electrode and the positive electrode and provide a flow path for lithium ions. The separator is not particularly limited as long as it is used as a separator in a common lithium secondary battery, and, in particular, a separator which exhibits low resistance to migration of electrolyte ions and has an excellent electrolyte impregnation ability is preferred. Specifically, the separator may be a porous polymer film made of a polyolefin-based polymer such as an ethylene homopolymer, a propylene homopolymer, an ethylene/butene copolymer, an ethylene/hexene copolymer, an ethylene/methacrylate copolymer, etc., or a stacked structure having two or more layers made thereof. In addition, the separator may be a common porous non-woven fabric, for example, a non-woven fabric made of glass fiber with a high melting point, polyethylene terephthalate fiber, etc. Additionally, in order to ensure heat resistance or mechanical strength, the separator may be a coated separator including ceramic components or polymer materials, and optionally, may be used in a single-layer or multi-layer structure.

The electrolyte used in the present invention may be an organic liquid electrolyte, an inorganic liquid electrolyte, a solid polymer electrolyte, a gel-type polymer electrolyte, an inorganic solid electrolyte, a molten-type inorganic electrolyte, etc., which may be used in the fabrication of a lithium secondary battery, but the present invention is not limited thereto.

Specifically, the electrolyte may include an organic solvent and a lithium salt.

The organic solvent is not particularly limited as long as it may act as a medium capable of migrating ions involved in an electrochemical reaction of the battery. Specific examples of the organic solvent include ester-based solvents such as methyl acetate, ethyl acetate, γ-butyrolactone, ε-caprolactone, etc.; ether-based solvents such as dibutyl ether, tetrahydrofuran, etc.; ketone-based solvents such as cyclohexanone, etc.; aromatic hydrocarbon-based solvents such as benzene, fluorobenzene, etc.; carbonate-based solvents such as dimethyl carbonate (DMC), diethyl carbonate (DEC), ethyl methyl carbonate (EMC), ethylene carbonate (EC), propylene carbonate (PC), etc.; alcohol-based solvents such as ethyl alcohol, isopropyl alcohol, etc.; nitriles such as R—CN (R is a C2 to C20 hydrocarbon group with a linear, branched or cyclic structure and may include a double-bonded aromatic ring or an ether linkage), etc.; amides such as dimethylformamide, etc.; dioxolane such as 1,3-dioxolane, etc.; and sulfolane. Among these compounds, the carbonate-based solvent is preferred, and a mixture of a cyclic carbonate having high ionic conductivity and a high dielectric constant, which are capable of increasing the charging and discharging performance of the battery (e.g., EC, PC, etc.), and a linear carbonate-based compound with low viscosity (e.g., EMC, DMC, DEC, etc.) is more preferred. In this case, when the cyclic carbonate and chain carbonate are mixed at a volume ratio of about 1:1 to about 1:9, excellent performance of the electrolyte may be exhibited.

The lithium salt is not particularly limited as long as it is a compound capable of providing lithium ions used in the lithium secondary battery. Specific examples of the lithium salt include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. $LiCl$, $LiI$, $LiB(C_2O_4)_2$, etc. The concentration of the lithium salt is preferably in a range of 0.1 to 2.0 M. When the concentration of the lithium salt falls within the above range, the electrolyte has appropriate conductivity and viscosity, and thus excellent performance of the electrolyte may be exhibited, and lithium ions may be effectively migrated.

As described above, since the lithium secondary battery according to the present invention stably exhibits excellent discharge capacity, an excellent quick charging characteristic, and an excellent capacity retention rate, it is useful in portable electronic devices such as mobile phones, notebook computers, digital cameras, etc. and electric vehicles such as hybrid electric vehicles (HEVs), etc. In particular, the lithium secondary battery is preferably used as a constituent battery of medium- to large-sized battery modules. Therefore, the present invention also provides a medium- to large-sized battery module including the above-described secondary battery as a unit cell.

The medium- to large-sized battery module is preferably applied as power sources of electric vehicles, hybrid electric vehicles, devices for storing electric power, etc., which require high output and large capacity.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

EXAMPLE 1: PREPARATION OF NEGATIVE ELECTRODE ACTIVE MATERIAL FOR LITHIUM SECONDARY BATTERY

Preparation of First Negative Electrode Active Material Particle

Petroleum pitch, which is a by-product of petroleum extraction, was calcined through a coking process at 1,500° C. to form needle coke-based artificial graphite, and the artificial graphite thus formed was thermally treated at 3,000° C. for at least 1 hour to prepare graphitized primary artificial graphite particles having an average particle diameter ($D_{50}$) of 12 μm.

Subsequently, the primary artificial graphite particles, pitch, and a binder (PVDF) were put into a mixing reactor in a weight ratio of 98:1:1, and agglomerated by spinning at 1,500° C. and 3,000 rpm to prepare secondary artificial graphite particles having an average particle diameter ($D_{50}$) of 18 μm (porosity: 20%, (BET) specific surface area: 1.0 $m^2/g$).

Subsequently, the secondary artificial graphite particles and carbon-based pitch were mixed in a weight ratio of 95:5, and thermally treated at 3,000° C. to prepare first negative electrode active material particles including a carbon coating layer coating on the surface of secondary artificial graphite particle and having an average particle diameter ($D_{50}$) of 20 μm (porosity: 15%, (BET) specific surface area: 1.0 $m^2/g$).

Preparation of Second Negative Electrode Active Material Particle

As second negative electrode active material particles, natural graphite particles, which have an average particle diameter ($D_{50}$) of 9 μm, a porosity of 25%, and a (BET) specific surface area of 2.0 $m^2/g$ and are in the form of single particles, were prepared.

Preparation of Negative Electrode Active Material

Next, the first negative electrode active material particles and the second negative electrode active material particles were mixed in a weight ratio of 85:15 with a TK mixer to prepare a negative electrode active material (total porosity: 15%, (BET) specific surface area: 1.5 $m^2/g$).

EXAMPLE 2: PREPARATION OF NEGATIVE ELECTRODE ACTIVE MATERIAL FOR LITHIUM SECONDARY BATTERY

A negative electrode active material (total porosity: 25%, (BET) specific surface area: 3.5 $m^2/g$) for a lithium secondary battery was prepared in the same manner as in Example 1 except that the first negative electrode active material particles and the second negative electrode active material particles prepared in Example 1 were mixed in a weight ratio of 70:30.

EXAMPLE 3: PREPARATION OF NEGATIVE ELECTRODE ACTIVE MATERIAL FOR LITHIUM SECONDARY BATTERY

A negative electrode active material (total porosity: 12%, (BET) specific surface area: 1.0 $m^2/g$) for a lithium secondary battery was prepared in the same manner as in Example 1 except that the first negative electrode active material particles and the second negative electrode active material particles prepared in Example 1 were mixed in a weight ratio of 95:5.

EXAMPLE 4: PREPARATION OF NEGATIVE ELECTRODE ACTIVE MATERIAL FOR LITHIUM SECONDARY BATTERY

A negative electrode active material (total porosity: 28%, (BET) specific surface area: 3.7 $m^2/g$) for a lithium secondary battery was prepared in the same manner as in Example 1 except that natural graphite particles which have an average particle diameter ($D_{50}$) of 6 μm, a porosity of 30%, and a (BET) specific surface area of 4.0 $m^2/g$ and are in the form of single particles were used as second negative electrode active material particles.

EXAMPLE 5: PREPARATION OF NEGATIVE ELECTRODE ACTIVE MATERIAL FOR LITHIUM SECONDARY BATTERY

A negative electrode active material (total porosity: 18%, (BET) specific surface area: 2.2 $m^2/g$) for a lithium secondary battery was prepared in the same manner as in Example 1 except that natural graphite particles which have an average particle diameter ($D_{50}$) of 12 μm, a porosity of 15%, and a (BET) specific surface area of 1.2 $m^2/g$ and are in the form of single particles were used as second negative electrode active material particles.

COMPARATIVE EXAMPLE 1: PREPARATION OF NEGATIVE ELECTRODE ACTIVE MATERIAL FOR LITHIUM SECONDARY BATTERY

A negative electrode active material for a lithium secondary battery was prepared in the same manner as in Example 1 except that only the first negative electrode active material particles prepared in Example 1 were used.

COMPARATIVE EXAMPLE 2: PREPARATION OF NEGATIVE ELECTRODE ACTIVE MATERIAL FOR LITHIUM SECONDARY BATTERY

A negative electrode active material (total porosity: 14%, (BET) specific surface area: 1.1 $m^2/g$) for a lithium secondary battery was prepared in the same manner as in Example 1 except that the first negative electrode active material particles and the second negative electrode active material particles prepared in Example 1 were mixed in a weight ratio of 98:2.

COMPARATIVE EXAMPLE 3: PREPARATION OF NEGATIVE ELECTRODE ACTIVE MATERIAL FOR LITHIUM SECONDARY BATTERY

A negative electrode active material (total porosity: 28%, (BET) specific surface area: 3.7 m$^2$/g) for a lithium secondary battery was prepared in the same manner as in Example 1 except that the first negative electrode active material particles and the second negative electrode active material particles prepared in Example 1 were mixed in a weight ratio of 65:35.

COMPARATIVE EXAMPLE 4: PREPARATION OF NEGATIVE ELECTRODE ACTIVE MATERIAL FOR LITHIUM SECONDARY BATTERY

A negative electrode active material (total porosity: 35%, (BET) specific surface area: 5.2 m$^2$/g) for a lithium secondary battery was prepared in the same manner as in Example 1 except that the first negative electrode active material particles prepared in Example 1 and artificial graphite particles having an average particle diameter ($D_{50}$) of 6 μm and a (BET) specific surface area of 7.0 m$^2$/g were mixed in a weight ratio of 85:15.

EXPERIMENTAL EXAMPLES

Manufacture of Negative Electrode for Lithium Secondary Battery

Each of the negative electrode active materials prepared in Examples and Comparative Examples, Super C65 as a conductive material, styrene-butadiene rubber (SBR) as a binder, and carboxymethyl cellulose (CMC) as a thickener were mixed in a weight ratio of 95.9:1:1.9:1.2, and water was added to prepare a negative electrode slurry.

Subsequently, the negative electrode slurry was applied on a copper foil in such a way that the thickness of the applied slurry was 65 μm, vacuum-dried at about 130° C. for 8 hours, and rolled to manufacture a negative electrode. In this case, the negative electrode was manufactured in such a way that loading capacity was 3.61 mAh/cm$^2$.

Fabrication of Lithium Secondary Battery

LiNi$_{0.6}$Co$_{0.2}$Mn$_{0.2}$O$_2$ as a positive electrode active material, Li-435 (commercially available from Denka Singapore Private Limited) as a conductive material, a mixture prepared by mixing KF9700 (commercially available from Kureha Corporation) and BM-730H (commercially available from Zeon Corporation) in a weight ratio of 90:10 as a binder, and Daicel 2200 (commercially available from Daicel Corporation) as a thickener were mixed in a weight ratio of 96.25:1.0:1.5:1.25, and water was added to prepared a positive electrode slurry. Subsequently, the positive electrode slurry was applied on an aluminum foil in such a way that the thickness of the applied slurry was 12 μm, vacuum-dried at about 130° C. for 8 hours, and rolled to manufacture a positive electrode. In this case, the positive electrode was manufactured in such a way that loading capacity was 3.25 mAh/cm$^2$, and had a porosity of 25%.

A polyolefin separator was interposed between the negative electrode and the positive electrode, and then an electrolyte solution prepared by dissolving 0.7 M LiPF$_6$ and 0.3 M LIFSI in a non-aqueous electrolyte solvent in which ethylene carbonate (EC) and ethyl methyl carbonate (EMC) were mixed in a volume ratio of 3:7 was injected to fabricate a monocell-type full-cell secondary battery.

1. Evaluation of High-Temperature Storage Characteristic

The SOC of each secondary battery of Examples and Comparative Examples was adjusted to 95%, the secondary battery was stored at a high temperature of 60° C. for 6 weeks, and a residual capacity retention rate (%) and an increase rate (%) in resistance were determined in each period (1, 2, 4, and 6 weeks). Results of a residual capacity retention rate (%) and an increase rate (%) in resistance as determined upon storage for 4 weeks are shown in Table 1 below.

TABLE 1

| Classification | Examples | | | | | Comparative Examples | | | |
|---|---|---|---|---|---|---|---|---|---|
| | 1 | 2 | 3 | 4 | 5 | 1 | 2 | 3 | 4 |
| Capacity retention rate (%) | 98.0 | 97.2 | 97.5 | 96.0 | 95.8 | 79.0 | 79.2 | 80.2 | 80.7 |
| Increase rate in resistance (%) | 32 | 34 | 36 | 37 | 37.5 | 60 | 59.8 | 64 | 57.6 |

2. Evaluation of Discharge Capacity and Initial Efficiency

Each secondary battery of Examples and Comparative Examples was charged and discharged. Then, discharge capacity and initial efficiency were evaluated, and results thereof are shown in Table 2 below.

Meanwhile, charging and discharging were performed at 0.1 C in the 1$^{st}$ and 2$^{nd}$ cycles and at 0.5 C in the 3$^{rd}$ to 49$^{th}$ cycles. The 50$^{th}$ cycle was completed when a charged state (a state in which lithium ions were intercalated into a negative electrode) was reached, and the battery was disassembled to measure a thickness of the electrode. Afterward, a thickness change rate of the electrode was calculated.

Charging condition: Constant current (CC)/constant voltage (CV) (5 mV/0.005 C current cut-off)

Discharging condition: Constant current (CC) 1.5V condition

From a result obtained based on the 1$^{st}$ cycle of charging and discharging, discharge capacity (mAh/g) and initial efficiency (%) were derived. Specifically, initial efficiency (%) was calculated as follows.

Initial efficiency (%)=(Discharge capacity after 1$^{st}$ discharging/Initial charge capacity)×100

TABLE 2

| Classification | Examples | | | | | Comparative Examples | | | |
|---|---|---|---|---|---|---|---|---|---|
| | 1 | 2 | 3 | 4 | 5 | 1 | 2 | 3 | 4 |
| Discharge capacity (mAh/g) | 353.5 | 353.0 | 351.5 | 351.8 | 352.1 | 350.0 | 350.2 | 350.5 | 348.5 |
| Initial efficiency (%) | 94.45 | 94.35 | 94.42 | 94.40 | 94.42 | 93.00 | 92.49 | 92.33 | 92.40 |

3. Evaluation of Quick Charging Characteristic

The negative electrodes for a lithium secondary battery of Examples and Comparative Examples manufactured in Experimental Example were subjected to a Li-plating test.

First, the above-manufactured negative electrode for a lithium secondary battery was punched to a size of a coin cell, and a polyolefin separator was then interposed between the negative electrode and a lithium foil which was a counter electrode thereof. Afterward, an electrolyte solution prepared by dissolving 1 M $LiPF_6$ in a solvent in which ethylene carbonate (EC) and ethyl methyl carbonate (EMC) were mixed in a volume ratio of 50:50 was injected to fabricate coin-type half-cells of Examples and Comparative Examples.

The coin-type half-cell thus fabricated was charged and discharged at 0.1 C for 3 cycles, and a 1.6 C-rate current value was then calculated. After charging the cell at 1.6 C for 28 minutes, an inflection point when the resultant profile was primarily differentiated (dQ/dV) was identified, and Li-plating SOC (%), which is the SOC at the time point where lithium began to precipitate on a surface of the negative electrode, was quantified. Results thereof are shown in Table 3 below.

TABLE 3

| Classification | Examples | | | | | Comparative Examples | | | |
|---|---|---|---|---|---|---|---|---|---|
| | 1 | 2 | 3 | 4 | 5 | 1 | 2 | 3 | 4 |
| Li-plating SOC (%) | 68 | 64 | 66 | 61 | 60 | 48 | 47 | 42 | 31 |

Referring to Tables 1 to 3, it can be confirmed that the negative electrode active material including first and second negative electrode active material particles according to the present invention was significantly excellent in high-temperature storage performance, discharge capacity, and a quick charging characteristic compared to Comparative Examples.

In addition, it can be confirmed that, compared to Example 1, in the case of Examples 2 to 5 in which the mixing ratio of first and second negative electrode active material particles or the average particle diameter ($D_{50}$) of second negative electrode active material particles was slightly out of the desired ranges, performance such as high-temperature storage performance, discharge capacity, and a quick charging characteristic was slightly degraded, but superior performance was exhibited.

Additionally, the negative electrodes using negative electrode active material particles according to Comparative Examples, in which second negative electrode active material particles according to the present invention were included in an inappropriate content ratio or not included at all, were evaluated to exhibit a significantly degraded high-temperature storage characteristic compared to Examples, and this is considered to be due to the fact that, when the negative electrode active materials of Comparative Examples were rolled, the specific surface area was greatly changed, and the structure of an electrode was changed, thereby rolling performance was significantly degraded. In addition, the negative electrodes according to Comparative Examples were evaluated to have a significantly degraded quick charging characteristic compared to Examples, and this is considered to be due to the fact that in the case of the negative electrodes according to Comparative Examples, charge transfer resistance of lithium ions was increased compared to Examples. In particular, it can be confirmed that, in the case of Comparative Example 4 in which artificial graphite particles were used as a particle with a small particle diameter, high-temperature storage performance and quick charging performance as well as capacity efficiency were significantly degraded compared to Examples in which natural graphite particles were used as second negative electrode active material particles.

The invention claimed is:

1. A negative electrode active material for a lithium secondary battery, comprising:
    first negative electrode active material particles comprising artificial graphite particles and a carbon coating layer formed on the artificial graphite particles; and
    second negative electrode active material particles comprising natural graphite particles,
    wherein the first negative electrode active material particles have a BET specific surface area ranging from 0.5 $m^2/g$ to 3 $m^2/g$,
    wherein the second negative electrode active material particles have a BET specific surface area ranging from 1.5 $m^2/g$ to 2.5 $m^2/g$,
    wherein the first negative electrode active material particles have a larger average particle diameter ($D_{50}$) than an average particle diameter ($D_{50}$) of the second negative electrode active material particles,
    a weight ratio of the first negative electrode active material particles to the second negative electrode active material particles is in a range of 70:30 to 95:5,
    wherein the first negative electrode active material particles have a spherical shape,
    wherein the second negative electrode active material particles have a spherical shape, and
    wherein the second negative electrode active material particles have an average particle diameter ($D_{50}$) of 8 μm to 11 μm.

2. The negative electrode active material of claim 1, wherein the weight ratio of the first negative electrode active material particles to the second negative electrode active material particles is in a range of 75:25 to 90:10.

3. The negative electrode active material of claim 1, wherein the first negative electrode active material particles have an average particle diameter ($D_{50}$) of 15 μm to 25 μm.

4. The negative electrode active material of claim 1, wherein the artificial graphite particles are secondary artificial graphite particles, wherein each secondary artificial graphite particle comprises a plurality of primary artificial graphite particles agglomerated together.

5. The negative electrode active material of claim 1, wherein the natural graphite particles are not agglomerated.

6. The negative electrode active material of claim 1, wherein the carbon coating layer is present in an amount of 3.5 parts by weight to 8 parts by weight with respect to 100 parts by weight of the first negative electrode active material particles.

7. The negative electrode active material of claim 1, wherein the negative electrode active material has a total porosity of 10% to 30%.

8. A negative electrode for a lithium secondary battery, comprising:
   a negative electrode current collector; and
   a negative electrode mixture layer formed on the negative electrode current collector,
   wherein the negative electrode mixture layer comprises the negative electrode active material of claim 1.

9. A lithium secondary battery comprising the negative electrode of claim 8.

10. The negative electrode active material of claim 1, wherein first negative electrode active material particles comprise a pore between the carbon coating layer and a surface of the artificial graphite particles.

* * * * *